(No Model.)

S. T. WILLIAMS.
WHEEL.

No. 325,893. Patented Sept. 8, 1885.

Witnesses:
Geo. H. Potts
Geo. M. Finckel

Inventor:
Samuel T. Williams
By his Attorney
Ernest C. Webb

UNITED STATES PATENT OFFICE.

SAMUEL T. WILLIAMS, OF RED BANK, NEW JERSEY.

WHEEL.

SPECIFICATION forming part of Letters Patent No. 325,893, dated September 8, 1885.

Application filed November 12, 1884. (No model.)

*To all whom it may concern:*

Be it known that I, SAMUEL T. WILLIAMS, a citizen of the United States, residing at Red Bank, in the county of Monmouth and State of New Jersey, have invented certain new and useful Improvements in Wheels, of which the following is a full, clear, and exact description.

This invention relates to certain improvements in wheels of the class known as "tension" or "suspension" wheels, the object being to produce a light symmetrical wheel of sufficient strength and durability for the purposes for which it is designed to be used, and with its tensioning devices so arranged and adjusted that the spoke series may be strained to impart stiffness and rigidity without varying the proximity of the hubs or increasing the spread of the spokes.

To this end my invention consists in a wheel having a tire or rim and felly preferably in one piece and of T shape in cross-section, an axle having a threaded nib, a two-part hub, each composed of a sleeve having a flaring or dish-shaped end, a conical nut engaging the threaded nib of the axle at each end, and a disk or ring having an angular opening slipped onto each nut, and held by the wedging of the nut in the angular opening, and a spoke series looped through holes in the felly and riveted to the disks, and in the details of my improvement, all as hereinafter more fully described.

Figure 1:
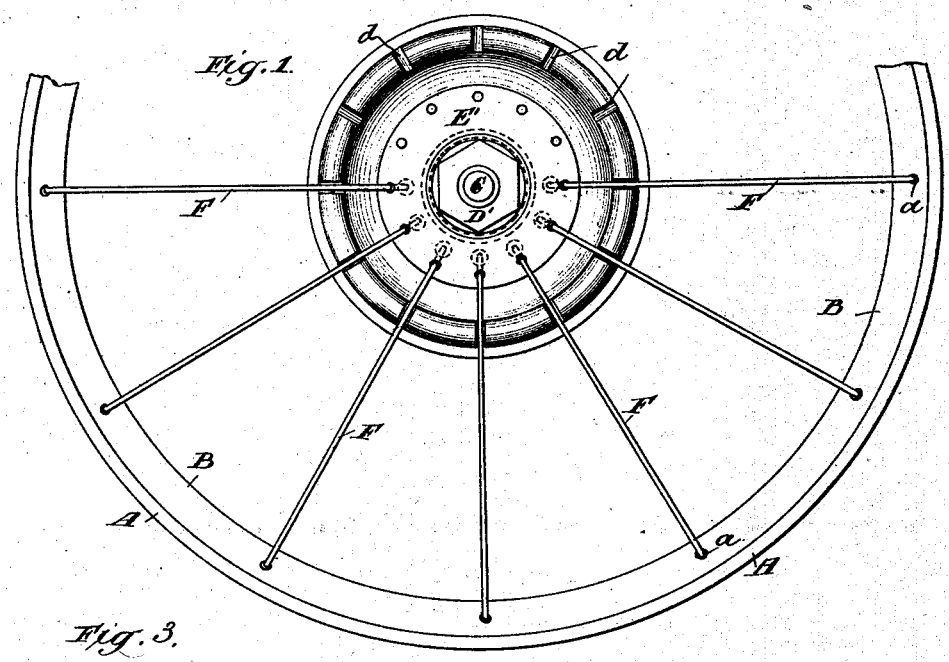
Figure 3:
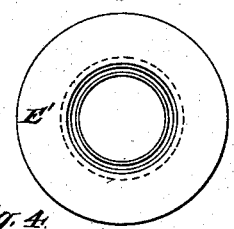
Figure 4:
Figure 2:
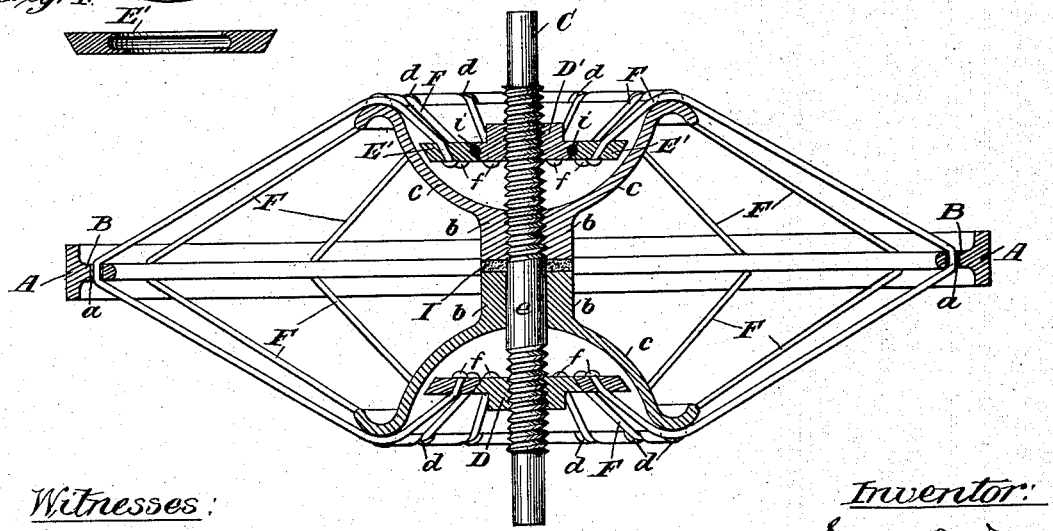

In the accompanying drawings, in which like parts are designated by similar letters of reference, Figure 1 is a side elevation of part of a wheel embodying my improvements. Fig. 2 is a sectional view thereof, and Figs. 3 and 4 are details.

A designates the tire or rim, and B the felly. They are preferably formed in one piece, as stated, although this is of course not essential, but only a matter of convenience in manufacture. The felly is provided with a series of holes, *a*, for the spoke series, drilled or punched at suitable distances.
If desired, the felly may be dispensed with, and in this case the tire or rim can either be provided with a series of transverse holes for the spokes, or lugs or staples may be used for this purpose, like those described in my application designated as "Case A" and filed on even date herewith.

C designates the axle on which the hubs are hung. These hubs are each composed of a sleeve, *b*, and a flaring or dish-shaped end, *c*, provided with a series of notches, *d*, in the rim, which is slightly curved. One of these hubs has its sleeve threaded to engage with the threaded nib of the axle, and the other is arranged to be slipped over the other end of the axle and to rest on the smooth surface *e* of the axle. This smooth portion of the axle is purposely made longer than the sleeve, to allow the latter to have a slight lateral movement. Between the inner ends of the sleeves I wrap the axle with rubber, felt, leather, or other flexible material, I, to make an elastic bearing for the inner ends of the sleeves.

D D' designate conical nuts engaging the threaded nib at each end of the axle, and E E' designate disks or rings supported on the nuts. These disks or rings each have a central angular opening, in which the nut may be rotated, the diameter of this opening gradually increasing from the inner to the outer edge of the disk or ring, to correspond to the diameter of that portion of the nut which enters the opening. Each disk is provided with as many holes, to receive the spoke ends, as there are spokes on a side. The disk E' has a groove in its inner face to correspond with a similar groove in the outer face of the nut D', and the space thus formed, when these grooves are brought opposite each other, is intended to be utilized for the expansion of a spring, *i*, or a ring of rubber or other flexible material, which is to be inserted in the groove in the nut or disk. The object of this is to compensate to a certain extent for the rigidity of the hub, which at this side of the wheel is practically fixed to the axle.

F designates the spoke series, which is preferably composed of strips of steel wire, one strip forming two spokes, and being applied and tensioned as follows, viz: Each strip is looped through the holes *a* in the felly, and the ends are drawn to the hubs at opposite sides of the wheel into the notches *d*, and through the holes in the disks, and the ends projecting through these holes are then provided with rivet-heads *f*, to preclude their being drawn out through the holes in the disks when strained. The nuts D D' are then rotated toward each other until they become wedged in the angular opening in their respective disks, and the inward movement of the nuts being continued, the disks are then carried toward each other, thus producing a tense strain on the spokes by means of the dish-shaped hubs and without separating or, in fact, disturbing the relative position of the hubs. A reverse movement of the nuts will release the strain on the spokes and render them pliant again.

In this manner the stiffness of the spokes may be regulated when desired without affecting the symmetrical appearance of the wheel in the least, a result which it is difficult to accomplish by any of the tension devices now in use which include the separation of nuts or bosses on the axle, to spread the spokes on one side away from those on the other.

Any sudden jar or strain to which the wheel may be subjected in use is taken up by the lateral movement of the sliding hub against the flexible bearing I, the flexible coil $i$ in the grooves between the faces of the nut also serving to impart some elasticity to the parts.

The spokes in this wheel may, if desired, be looped through the holes in the felly and through the holes in one disk, and the ends welded together, thus making each spoke of two thicknesses of metal, which could be twisted together, if desired. When this method is followed one piece of metal would only form a single spoke, and it would be necessary to have as many holes in the felly as there were holes in both disks.

What I claim as my invention, and desire to secure by Letters Patent, is—

1. The method herein described of straining or tensioning the spokes of a wheel by the rotation of nuts on the axle, operating to force the spoke-disks toward each other, and thus drawing the spokes over the flaring rims of the hubs, substantially as herein shown and described.

2. In a wheel having flexible spokes connecting the tire or felly with the axle, the combination of hubs having flaring ends bearing against the spokes, and disks to which the spoke ends are fastened, with nuts on the axle adapted to be rotated, to move said disks toward each other, and thus tension the spokes without varying the proximity of the hubs or increasing the spread of the spokes, substantially as herein shown and described.

3. The combination, in a wheel, of an axle having a threaded nib, a hub in two parts, each composed of a sleeve surrounding the axle, and a flaring or dish-shaped end, a conical nut engaging the threaded nib of the axle at each end, a disk or ring supported by each nut, and a spoke series connected to the tire or felly and the disks or rings, substantially as herein shown and described.

4. In a tension-wheel, the axle C, provided with the two spoke-supporting portions, each consisting of a sleeve, $b$, having the outwardly-flaring dish-shaped flanges $c$, and a series of spoke-retaining notches, $d$, combined with the spoke-receiving rings or disks E E', located in the dish-shaped portion, and means for moving and holding said rings or disks in place, substantially as shown, and for the purpose specified.

5. In a tension-wheel of substantially the construction described, the combination of one of the spoke-receiving disks and its nut with a spring or band of rubber, or other flexible material, coiled in a groove between the bearing of the disk and nut, as set forth, for the purposes described.

In testimony whereof I have hereunto set my hand this 6th day of November, A. D. 1884.

SAMUEL T. WILLIAMS.

Witnesses:

ARTHUR C. WEBB,
ERNEST C. WEBB.